United States Patent
Tarzia

[19]

[11] Patent Number: 6,035,458
[45] Date of Patent: Mar. 14, 2000

[54] BIDET VALVE

[76] Inventor: Umberto Tarzia, 165 Flatbush Avenue, Woodbridge, Ontario, Canada, L4K 8K2

[21] Appl. No.: 09/240,835

[22] Filed: Feb. 1, 1999

Related U.S. Application Data

[60] Provisional application No. 60/095,360, Aug. 5, 1998.

[51] Int. Cl.[7] .................................................. A61H 35/00
[52] U.S. Cl. ................................................ 4/443; 137/218
[58] Field of Search ................................ 4/443; 137/217, 137/218

[56] References Cited

U.S. PATENT DOCUMENTS

| | | | |
|---|---|---|---|
| 2,115,499 | 4/1938 | Salvoni | 137/217 |
| 4,589,438 | 5/1986 | Breda | 4/443 X |
| 4,953,585 | 9/1990 | Rollini et al. | 137/218 |

Primary Examiner—Robert M. Fetsuga
Attorney, Agent, or Firm—Arne I. Fors

[57] ABSTRACT

A riser-type bidet valve includes a diverter body, a diverter collar threaded onto the diverter body, a valve actuator mounted for axial reciprocal travel concentric with the diverter body and diverter collar, a valve mounted on the valve actuator at the base thereof for travel between a diverter body lower outlet valve seat and an upper outlet valve seat whereby actuation of the valve actuator selectively opens and closes the lower and upper valve seats, an atmospheric vacuum breaker valve mounted for slidable travel on the valve actuator concentric with the diverter collar at the upper end thereof, a closure cap threaded into the upper end of the diverter collar, the closure cap having a valve seat, and a spring for urging the atmospheric vacuum breaker valve upwardly against the closure cap valve seat and for permitting the atmospheric vacuum breaker valve to open upon creation of a negative pressure within the bidet valve to permit ingress of atmospheric air. The closure cap may have an enlarged central opening for air ingress, or a central opening for guiding axial travel of an extension of the valve actuator and a plurality of equispaced openings surrounding the central opening for air ingress.

11 Claims, 7 Drawing Sheets

BIDET VALVE

Provisional application 60/095,360, Aug. 5, 1998.

BACKGROUND OF THE INVENTION (i) Field of the Invention

This invention relates to a bidet valve and more particularly to a riser-type bidet valve having an atmospheric vacuum breaker to prevent the back siphonage of water.

(ii) Description of the Related Art

Bidet valves receive hot and cold water from separately valved water supplies to permit temperature adjustment, and then mix the hot and cold water and supply the blended water to either a circumferential rim in a bidet bowl for a rim wash or to a bidet spray head outlet centrally located in the bidet bowl. A user can selectively divert water to the circumferential rim of the bowl or to the central spray head by actuation of the valve.

North American plumbing codes typically require a vacuum breaker, i.e. a pressure relief valve, be installed in the water supply lines to the bidet to obviate reverse siphoning and back-flow of contaminated water from the bidet bowl to the water supply lines.

U.S. Pat. No. 5,063,619 issued Nov. 12, 1991 to U.S. Tap Inc. discloses a vacuum breaker comprising a piston check valve. During normal operations, water under pressure actuates the piston valve to its closed position, such that it is seated against a flat valve surface and closes off the vacuum breaker inlet. A loss of water pressure will allow gravity to pull the piston valve away from the valve seat, opening up the vacuum breaker inlet and positioning the piston valve to prevent reverse flow from the outlet.

U.S. Pat. No. 4,951,702 issued Aug.28, 1990 to Canceramic Limited, describes a non-rise bidet valve having a vacuum breaker poppet valve actuable to open or close an air inlet into a vacuum breaker chamber. Water pressure in a stem chamber forces the poppet valve to its uppermost closed position, sealing an air inlet port. Pressure reduction in the water supply will result in the poppet valve opening the air inlet port to allow air to flow into a vacuum breaker chamber, thus preventing any reverse siphoning of waste water.

Known bidet valves are relatively complex, expensive to manufacture, unsightly, and often have difficulty meeting minimum plumbing code requirements.

SUMMARY AND OBJECTS OF THE INVENTION

It is a principal object of the present invention to provide a riser-type bidet valve which is simple in construction, substantially trouble-free in operation and relatively inexpensive to manufacture.

It is another object of the invention to provide an atmospheric vacuum breaker integral with a diverter valve for use in a bidet which will fully comply with plumbing code specifications in North America.

A further object of the invention is the provision of a vertically "pull up push down" valve in place of the conventional rotary valve. A still further object of the invention is the provision of an aesthetic, low profile valve handle having a height at substantially the height of the bidet hot and cold water handles, to aesthetically complement the hot and cold handles.

And another object of the invention is the provision of an annular vacuum breaker air inlet or a plurality of air inlets surrounding the valve diverter rod for enhanced air intake, while utilizing the diverter rod as a spindle for vertically reciprocal guided travel of the valve.

In its broad aspect, the bidet valve of the invention comprises a diverter body having hot and cold water inlets, a lower outlet with a valve seat for egress of water to a bidet douche spray, and an upper outlet with a valve seat for egress of water to a bidet bowl wash, a diverter collar threaded onto said diverter body adapted to pass through an opening in a bidet bowl, means for removably securing said diverter collar to the bidet bowl, a valve actuator having a lower end and an upper end mounted for axial reciprocal travel concentric with said diverter body and diverter collar, a valve, preferably an O-ring mounted on said valve actuator at the lower end for axial travel between the diverter body lower outlet valve seat and upper outlet valve seat whereby axial actuation of said valve actuator selectively opens and closes the lower or upper valve seats, an atmospheric vacuum breaker valve mounted for axial slidable travel on the valve actuator at the upper end concentric with the diverter collar, a closure cap threaded into the upper end of the diverter collar, said closure cap having a valve seat, and spring biasing means for urging said vacuum breaker valve upwardly against said closure cap valve seat during operation of the bidet and for permitting the vacuum breaker valve to open downwardly upon creation of a negative pressure within the vacuum breaker bidet valve to permit ingress of atmospheric air through the closure cap and around the vacuum breaker valve.

Another aspect of the invention is the provision of a closure cap having a central guide opening for axial guided travel of the valve actuator and a plurality of openings equispaced about the central guide opening for ingress of atmospheric air.

A still further aspect of the invention is the provision of a spring biasing means, such as a compression spring mounted concentrically with the valve actuator, for normally urging the valve actuator downwardly towards the diverter body lower outlet valve seat.

A still further aspect of the invention is the provision of an O-ring mount attached to the bottom end of the valve actuator.

A still further aspect of the invention is the provision of an O-ring mounted on the vacuum breaker valve such that the O-ring will seat against the closure cap valve seat when the vacuum breaker valve is in the upper normally-closed position.

BRIEF DESCRIPTION OF THE DRAWINGS

The bidet valve of the invention will now be described with reference to the drawings.

DESCRIPTION OF THE PREFERRED EMBODIMENT

Figure 1:
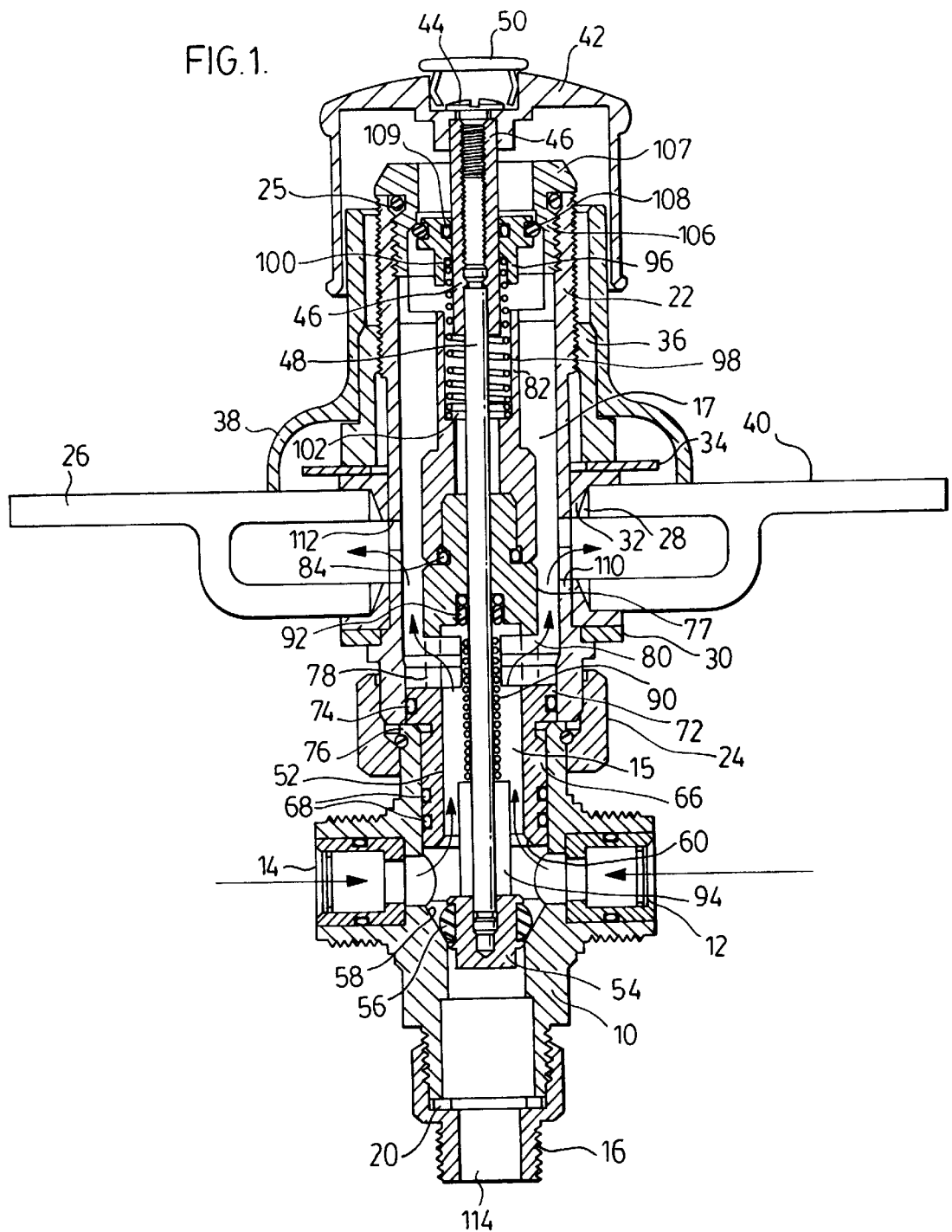
FIG. 1 is a longitudinal sectional view of a first embodiment of the bidet valve of the invention attached to a bidet bowl, showing the valve handle in a down position, diverting water flow upwards to the rim wash.
Figure 2:
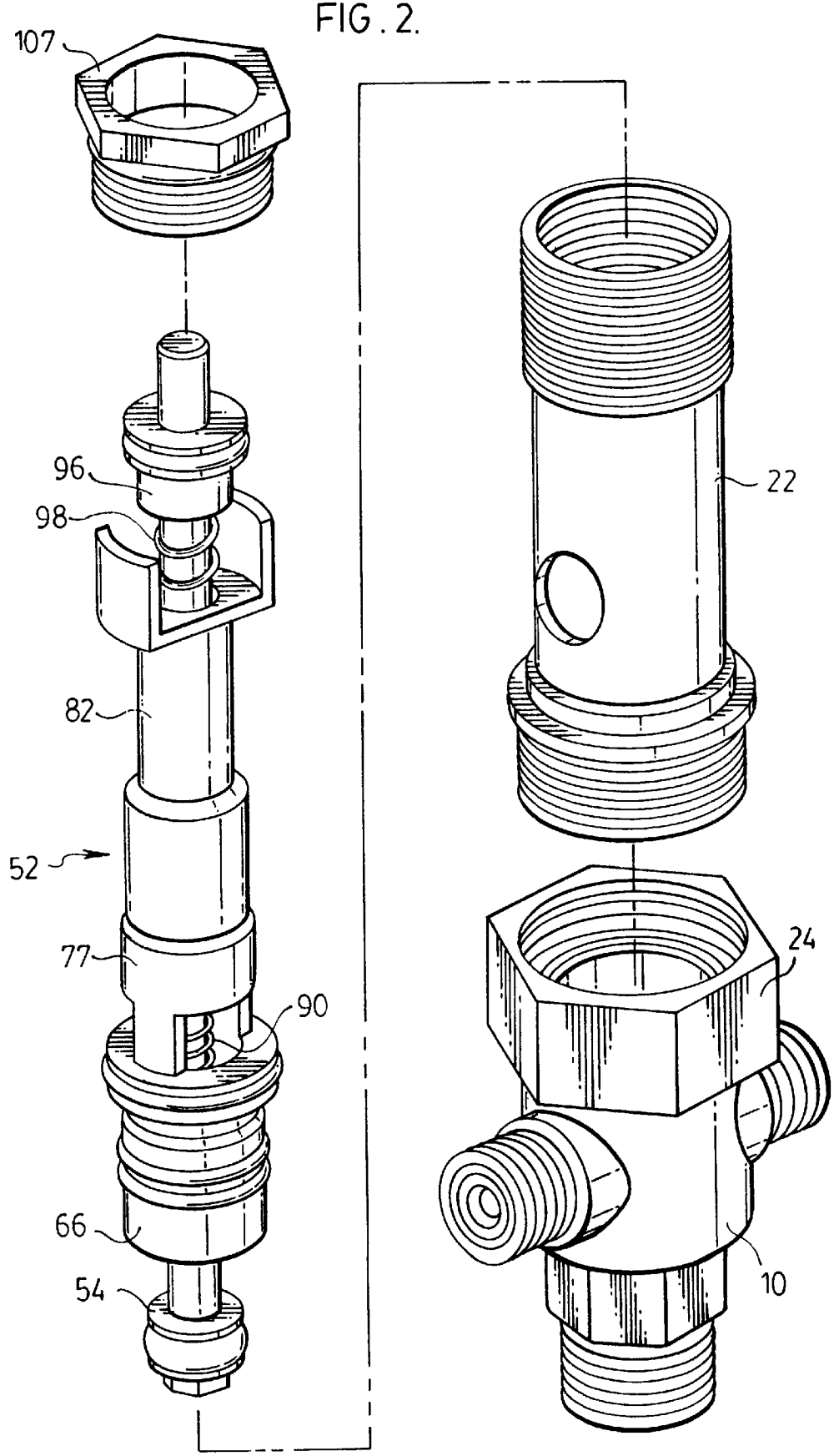
FIG. 2 is an axially exploded perspective view of the bidet valve shown in FIG. 1.

With reference first to FIGS. 1–4, diverter body 10 contains two diametrically-opposed water inlet check valve assemblies 12, 14, one for cold water inflow and the other for hot water inflow from valved supply lines, not shown. The volumes of hot and cold water inflow are separately controlled by the said remote bidet hot and cold water supply lines connected to faucet valves.

A reducer 16 such as a ½" to ⅜" reducer is screwed onto the threaded bottom of diverter body 10, with a liquid seal provided by ½" washer 20, for egress of water to a bidet jet or douche spray, not shown.

Diverter body 10 is attached to diverter collar 22 by mounting nut 24. The bidet valve is attached to the bidet bowl 26 by fastening diverter collar 22 into the bowl installation hole 28 using mounting ring 30 below the bowl opening, stainless steel washer 34 above the hole, and extension nut 36 threaded onto diverter collar 22 for compressing compressible washers 32 between upper steel washer 34 and lower mounting ring 30.

Handle flange cover 38 threaded onto extension nut 36 abuts the upper surface 40 of the bowl to conceal the valve mechanism and to further secure the valve to the bowl. Diverter handle 42 is secured by screw 44 to diverter rod extension 46 which in turn is threaded onto valve actuator diverter control rod 48. Handle 42 with cap 50 provide an aesthetically pleasing cover for the mechanism.

Valve actuator diverter rod 48 is slidably mounted for axial travel within cartridge body 52 concentric with diverter body 10 and diverter collar 22. The bottom end of diverter rod 48 is threaded to receive O-ring mount 54 having O-ring washer valve 56 which is adapted for axial reciprocal movement to engage lower valve seat 58 when in its downward position, as illustrated, or to engage upper valve seat 60 when in its upper position. Diverter cartridge body 52 comprises base member 66 having spaced-apart O-rings 68 adapted to seal the upper portion of diverter body 10. Shoulder 72 with O-ring 74 is seated on the upper edge 76 of diverter body 10. Base member 66 is joined integral with upper sleeve member 77 by a pair of diametric stirrups, shown by ghost lines 78, 80, which in turn receives upper extension 82 frictionally secured thereto by O-ring 84.

Compression spring 90 mounted concentric with diverter rod 48 abuts Teflon™ packing 92 at its upper end and abuts spacer 94 at its lower end to bias diverter rod 48 downwardly to its at-rest position shown in FIG. 1.

An annular atmospheric vacuum breaker valve 96 slidably mounted for reciprocal axial travel on diverter rod extension 46 at the upper end of diverter rod 48 is biased upwardly by vacuum breaker compression spring 98 which abuts at its upper end inner annular shoulder 100 formed near the base of valve 96 and abuts at its lower end inner annular shoulder 102 formed in upper extension 82 of the diverter cartridge body 52. Valve 96 thus is biased into the upper normally-closed position illustrated in the drawing with O-ring 106 seated on annular valve seat 108 of upper closure cap 107. Closure cap 107 is threaded into the upper end of diverter collar 22 and sealed with O-ring 25.

Figure 3:
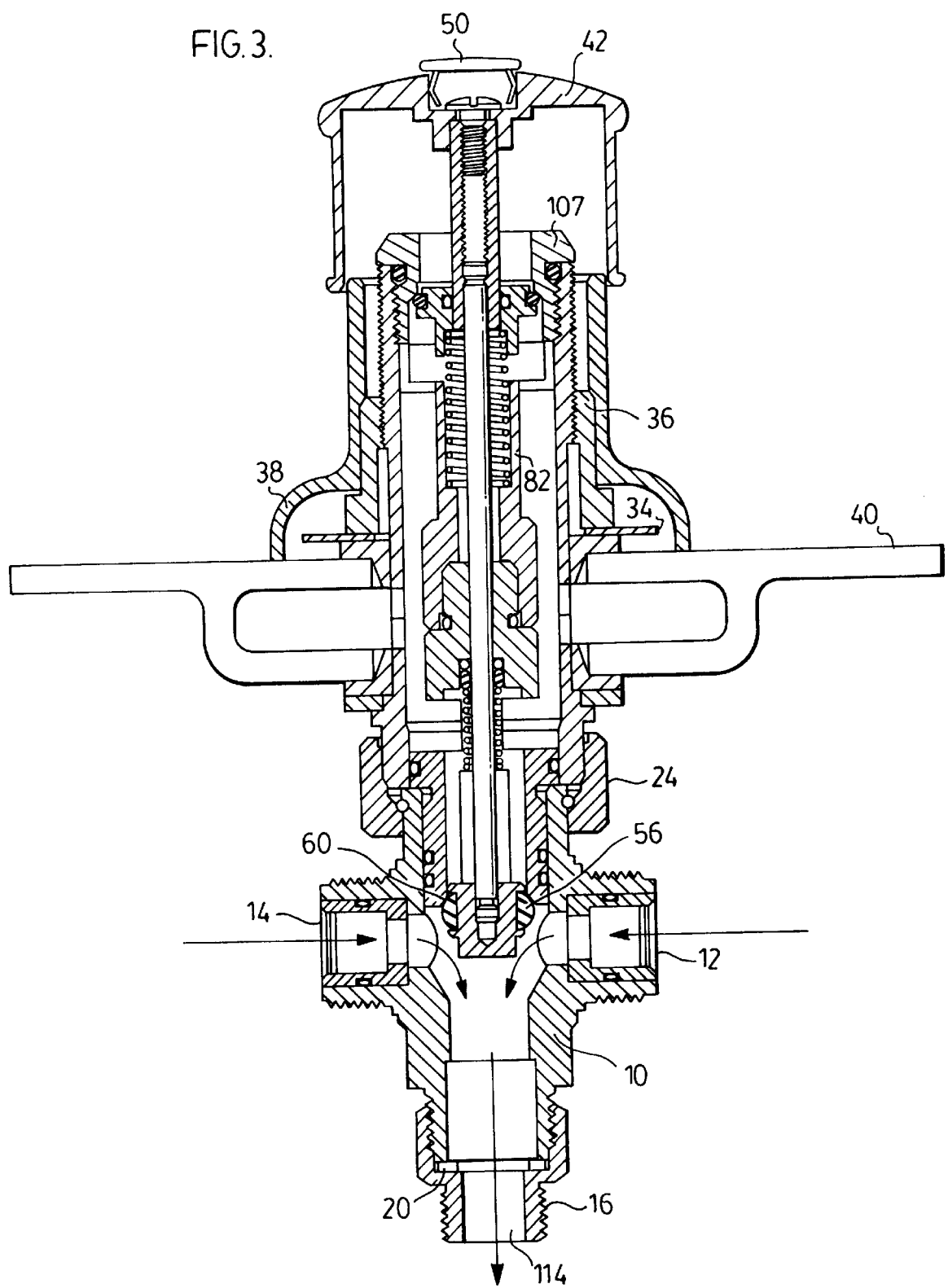
FIG. 3 is a longitudinal sectional view of the bidet valve shown in FIG. 1 showing the valve handle in an up position, diverting water flow downwards to the douche spray.
Figure 4:
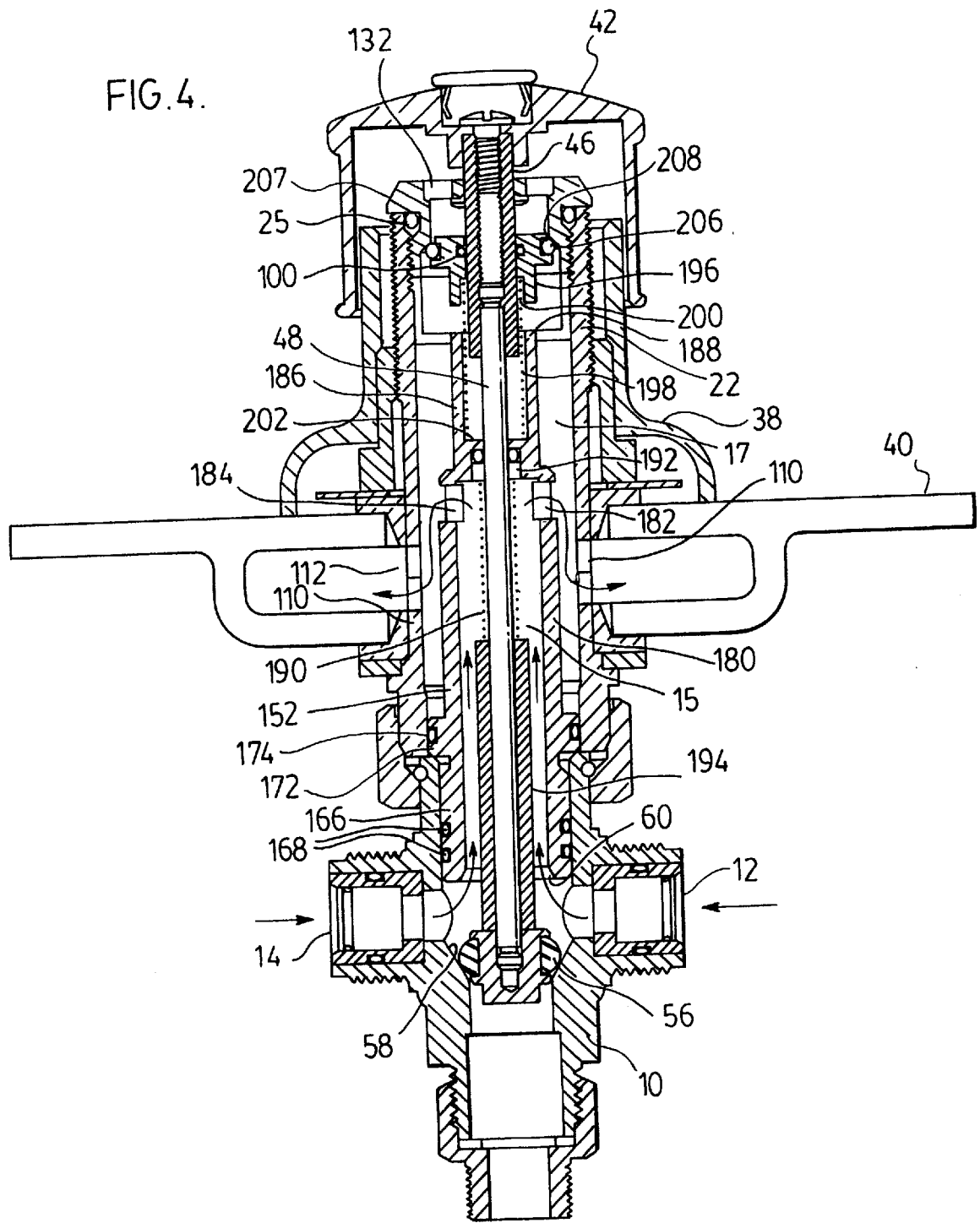
FIG. 4 is a longitudinal section of a second embodiment of the bidet valve of the invention attached to a bidet bowl, showing the valve handle in a down position.
Figure 5:
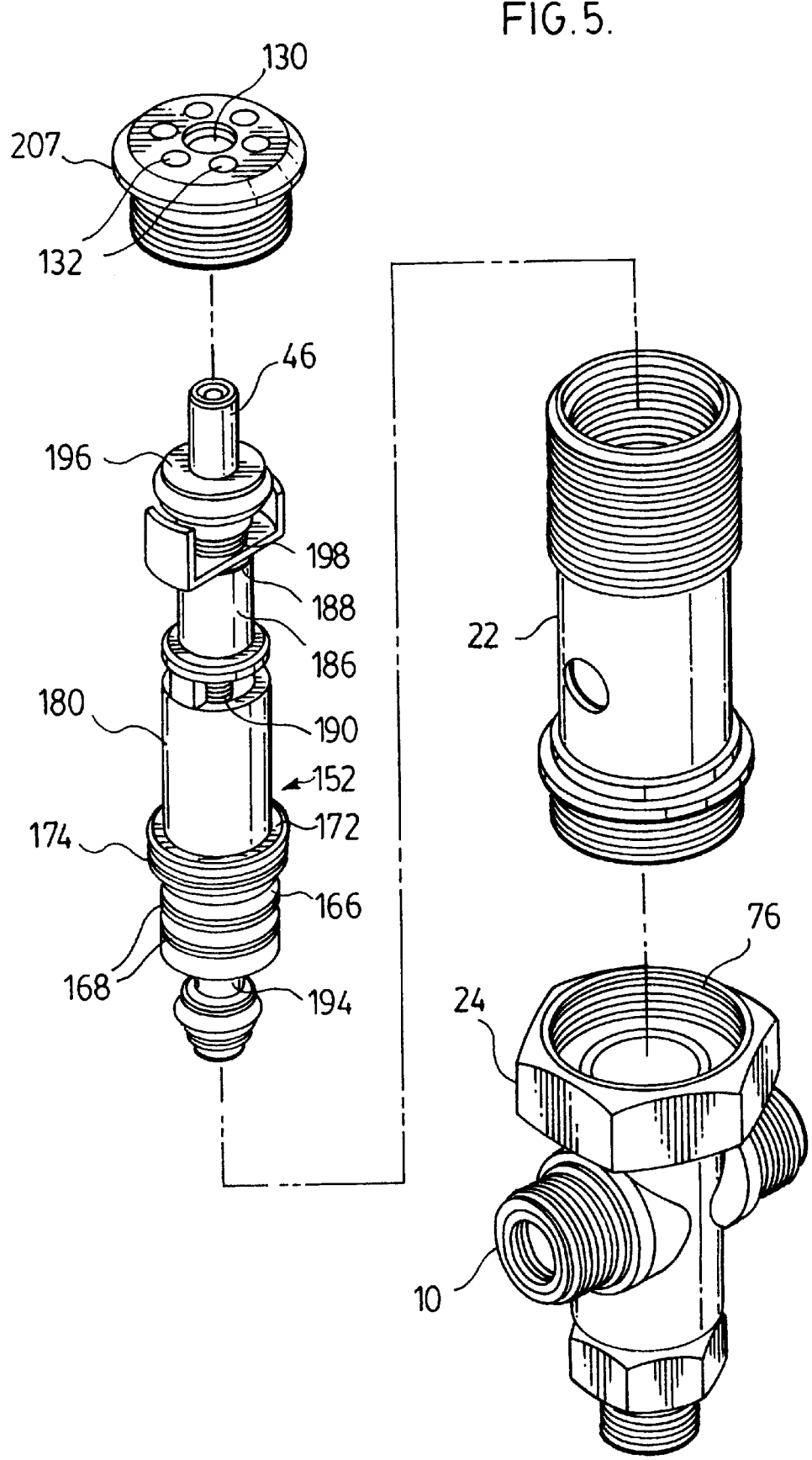
FIG. 5 is an axially exploded perspective view of the valve shown in FIG. 4.
Figure 6:
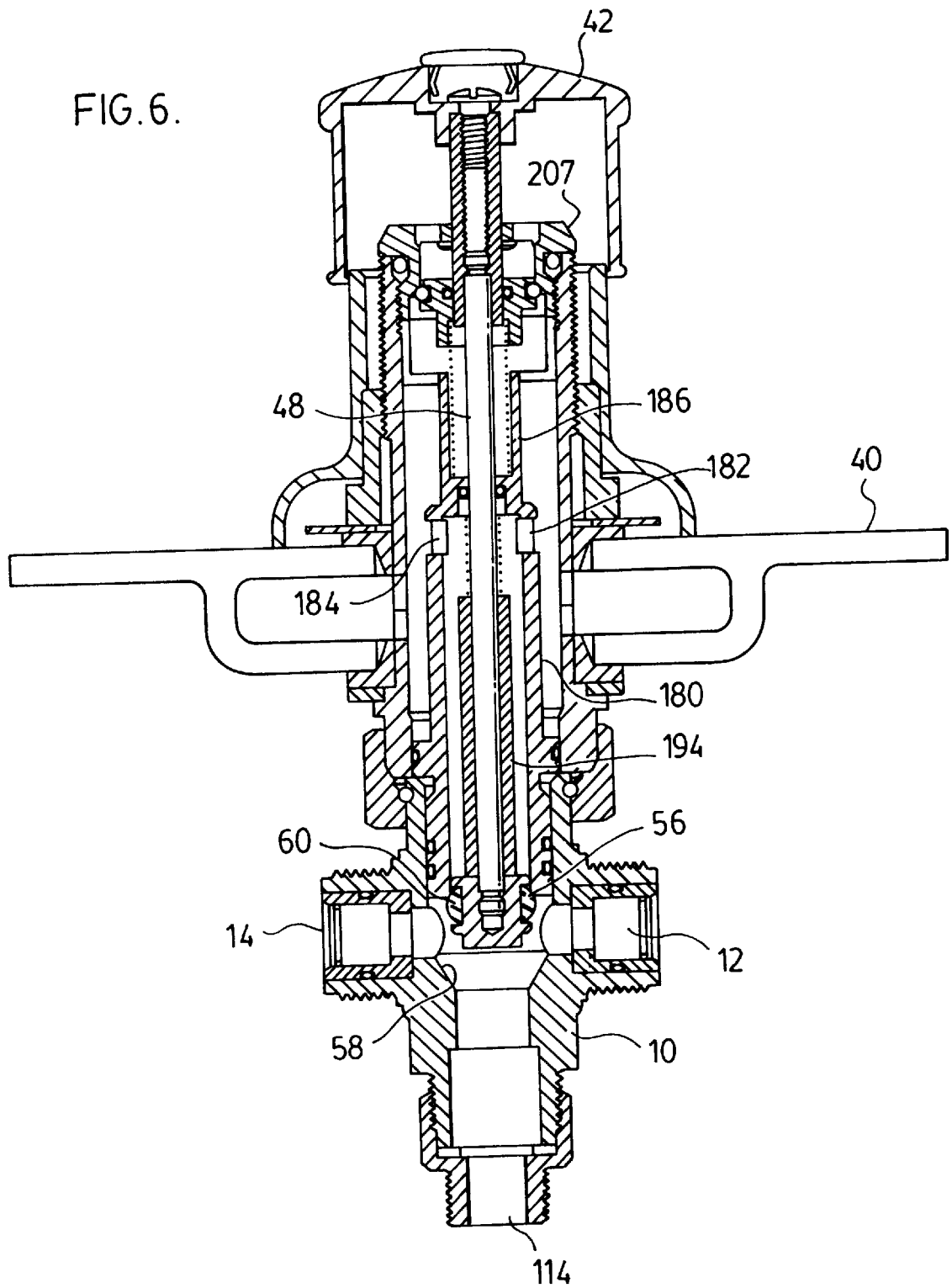
FIG. 6 is a longitudinal sectional view of the bidet valve shown in FIG. 4 showing the valve handle in an up position.
Figure 7:
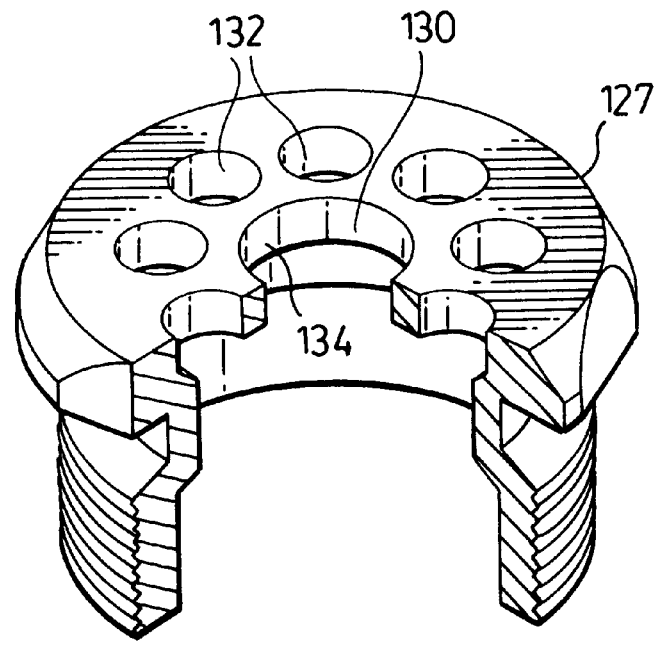
FIG. 7 is a perspective view partially cut away of the embodiment of closure cap shown in FIGS. 4–6.
Figure 8:
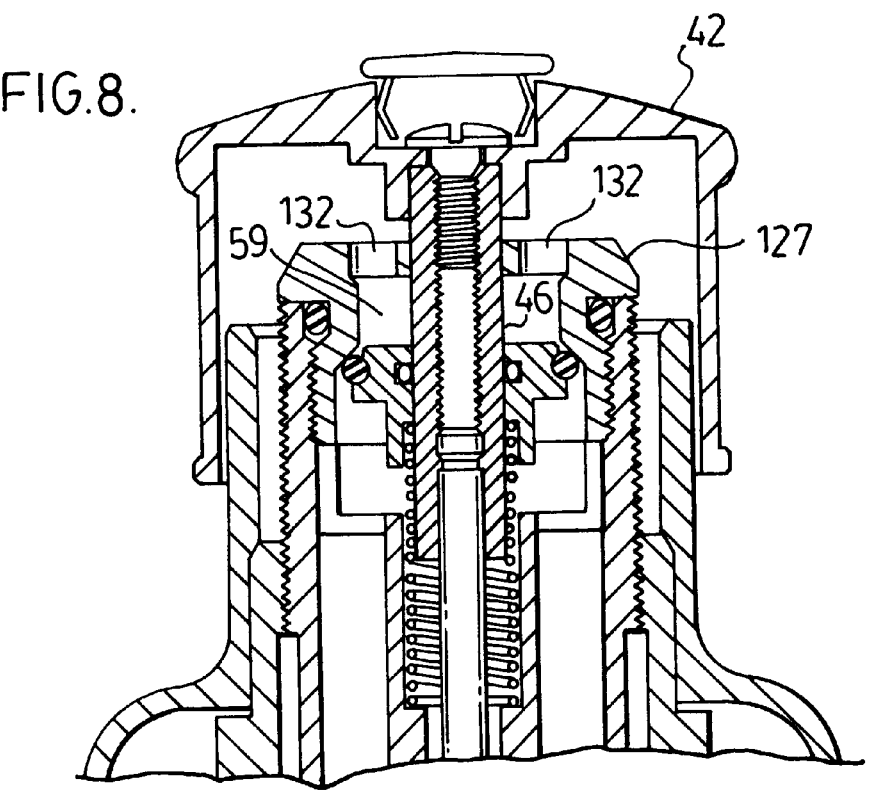
FIG. 8 is an enlarged longitudinal section showing the closure cap illustrated in FIGS. 4–6 in a closed position.

O-ring 56 normally abuts valve seat 58 under the bias of compression spring 90 when the bidet valve is in its inoperative, at-rest position, as illustrated in FIG. 1 with valve handle 42 and diverter control rod 48 in their down position, to close valve seat 58. Upon the opening of hot and cold water supply valves, water flows inwardly through valve assemblies 12, 14 to mix in chamber 15, as shown most clearly in FIG. 3, and then pass upwardly and outwardly through the outlets 110, 112 to the bidet bowl rim for rim wash. When the diverter handle is extended to its upward position, as shown in FIG. 3, washer O-ring 56 is actuated to its upper seating against annular valve seat 60 and the water flow is diverted downwardly through outlet 114 in communication with the bidet jet. Water flowing under pressure through diverter body 10 to the bidet jet will keep O-ring 56 in its upper position. When the hot and cold valves are closed, the water pressure in the diverter body 10 will drop, allowing compression spring 90 to urge diverter rod 48 carrying washer O-ring 56 downwardly to abut and close lower valve seat 58 while opening upper valve seat 60.

During the preliminary operating cycle when the water flow is initiated and water flow and temperature are adjusted, vacuum breaker spring 98 urges vacuum breaker valve 96 upwardly towards diverter cap 107. O-ring 106 abuts and closes valve seat 108 while O-ring 109 ensures a seal between vacuum breaker valve 96, and diverter rod extension 46.

The occurrence of a negative pressure which may be created in chamber 17 defined by collar 22, and in chamber 15, normally causes a back siphoning effect to draw contaminated water from the bowl into the valve. In the present invention, the negative pressure overcomes the upward bias of spring 98 to open valve 96 allowing air to flow into the bidet valve through the annulus defined by valve seat 108 to join air present in chamber 17 thereby preventing contaminated water from being drawn back from the bidet bowl into the valve from the bowl rim or douche spray and obviating contamination of potable water in the water lines. The air inlet annulus permits enhanced air flow while the diverter rod extension 46 functions as a guide post for axial reciprocal travel of the vacuum breaker valve 96.

With reference now to FIGS. 4–8, a second embodiment of the bidet valve of the present invention has elongated cartridge body 152 concentric with diverter body 10 and diverter collar 22. Cartridge body 152 comprises base member 166 having spaced-apart O-rings 168 adapted to seal the upper portion of diverter body 10. Shoulder 172 with O-ring 174 is seated on the upper edge 76 of diverter body 10. Base member 166 comprises elongated main sleeve 180 extending upwardly therefrom concentric with collar 22 having openings 182, 184, at a height above outlets 110, 112 for reasons which will become apparent as the description proceeds, and sleeve extension 186 extending to upper edge 188. Compression spring 190 mounted concentric with diverter actuator rod 48 abuts TEFLON™ packing 192 at its upper end and abuts elongated spacer 194 at its lower end to bias diverter rod downwardly to its normally at-rest position shown in FIG. 4.

Annular vacuum breaker valve 196 slidably mounted for reciprocal axial travel on diverter rod extension 46 at the upper end of diverter rod 48 is biased upwardly by vacuum breaker compression spring 198 which abuts at its upper end inner annular shoulder 200 formed near the base of valve 196 and abuts at its lower end inner annular shoulder 202 formed in upper extension 186 of the diverter cartridge body 152. Valve 196 thus is biased into the upper normally-closed position illustrated in the drawings with O-ring 206 seated on annular valve seat 208 of upper diverter cap 207. Diverter cap 207 is threaded into the upper end of diverter collar 22 and sealed with O-ring 25.

Diverter cap 207 has a central opening 130 (FIG. 7) adapted to receive diverter rod extension 46 in sliding reciprocal travel and a plurality of equispaced openings 132 surrounding said central opening 130 to permit airflow into the valve upon opening of valve 196. The circular wall 134 of central opening 130 provides lateral support of rod extension 46 to stabilize handle 42 during actuation.

The embodiment illustrated in FIGS. 4–8 permits compliance with the critical level as outlined in North American Plumbing Standards and ensures contaminated water in the bidet bowl cannot be drawn back into the valve. Also, the diverter cap not only provides lateral support to the rod extension 46 but the air gap 59 provides an instant air supply to the valve upon opening of the valve to further ensure pressure equalization.

It will be understood, of course, that modifications can be made in the embodiments of the invention described herein without departing from the scope and purview of the invention as defined by the appended claims.

I claim:

1. A riser-type bidet valve comprising: a diverter body having hot and cold water inlets, a lower outlet with a valve seat for egress of water to a bidet jet, and an upper outlet with a valve seat for egress of water to a bidet bowl rim, a diverter collar threaded onto said diverter body adapted to pass through an opening in a bidet bowl, means for removably securing said diverter collar to the bidet bowl, a valve actuator having a lower end and an upper end mounted for axial reciprocal travel concentric with said diverter body and diverter collar, a valve mounted on said valve actuator at the lower end thereof for axial travel between the diverter body lower outlet valve seat and upper outlet valve seat whereby actuation of said valve actuator selectively opens and closes the lower and upper valve seats, a vacuum breaker valve mounted for axial slidable travel on the valve actuator or extension thereof at the upper thereof concentric with the diverter collar, a closure cap threaded into the upper end of the diverter collar, said closure cap having a valve seat, and spring biasing means for urging said vacuum breaker valve upwardly against said closure cap valve seat during operation of the bidet and for permitting the vacuum breaker valve to open upon creation of a negative pressure within the valve to permit ingress of atmospheric air into the bidet valve during shut-down of the bidet.

2. A riser-type bidet valve as claimed in claim 1 further comprising spring biasing means for normally urging said valve mounted on said valve actuator at the lower end thereof downwardly towards said diverter body lower outlet valve seat.

3. A riser-type bidet valve as claimed in claim 2, in which said spring biasing means is a compression spring mounted concentric with said valve actuator.

4. A riser-type bidet valve as claimed in claim 3, in which the valve mounted at the lower end of the valve actuator is an O-ring.

5. A riser-type bidet valve as claimed in claim 1, in which said vacuum breaker valve includes an O-ring adapted to seat against said closure cap valve seat when the vacuum breaker valve is in the upper normally-closed position.

6. A riser-type bidet valve as claimed in claim 5, in which said closure cap has a central opening to permit air flow into the bidet valve.

7. A riser-type bidet valve as claimed in claim 5, in which said closure cap has a central opening for receiving said valve actuator or extension thereof in guided, reciprocal, sliding travel, and plurality of openings surrounding said central opening to permit air flow into the bidet valve.

8. A riser-type bidet valve comprising: a diverter body having hot and cold water inlets, a lower outlet with a valve seat for egress of water to a bidet jet, and an upper outlet with a valve seat for egress of water to a bidet bowl rim, a diverter collar threaded onto said diverter body adapted to pass through an opening in a bidet bowl, means for removably securing said diverter collar to the bidet bowl, a valve actuator having a lower end and an upper end mounted for vertical reciprocal travel concentric with said diverter body and diverter collar, a valve mounted on said valve actuator at the lower end thereof for vertical travel between the diverter body lower outlet valve seat and upper outlet valve seat whereby vertical actuation of said valve actuator selectively opens and closes the lower and upper valve seats, a compression spring mounted concentric with the valve actuator near the lower end thereof for normally biasing the said valve against the lower outlet valve seat, a vacuum breaker valve mounted for vertical slidable travel on the valve actuator or extension thereof at the upper end of the valve actuator concentric with the diverter collar, a closure cap threaded into the upper end of the diverter collar, said closure cap having a valve seat and an air chamber below the valve seat, and spring biasing means for urging said vacuum breaker valve upwardly against said closure cap valve seat during operation of the bidet and for permitting the vacuum breaker valve to open upon creation of a negative pressure within the valve to permit ingress of atmospheric air during shut-down of the bidet.

9. A riser-type bidet valve as claimed in claim 8, in which said vacuum breaker valve includes an O-ring adapted to seat against said closure cap valve seat when the vacuum breaker valve is in the upper normally-closed position.

10. A riser-type bidet valve as claimed in claim 8, in which said closure cap has a central opening to permit air flow into the bidet valve.

11. A riser-type bidet valve as claimed in claim 8, in which said closure cap has a central opening for receiving said valve actuator or extension thereof in guided, reciprocal, sliding travel, and plurality of openings surrounding said central opening to permit air flow into the bidet valve.

* * * * *